United States Patent
Song

(10) Patent No.: US 9,197,598 B2
(45) Date of Patent: Nov. 24, 2015

(54) MAC ADDRESS DISTRIBUTION

(71) Applicant: Hangzhou H3C Technologies Co., Ltd., Hangzhou (CN)

(72) Inventor: Xiaoheng Song, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 125 days.

(21) Appl. No.: 14/199,629

(22) Filed: Mar. 6, 2014

(65) Prior Publication Data

US 2014/0314100 A1    Oct. 23, 2014

(30) Foreign Application Priority Data

Apr. 19, 2013    (CN) .......................... 2013 1 0138188

(51) Int. Cl.
*H04L 29/12* (2006.01)
*H04L 12/743* (2013.01)

(52) U.S. Cl.
CPC ........ *H04L 61/6022* (2013.01); *H04L 45/7453* (2013.01)

(58) Field of Classification Search
None
See application file for complete search history.

(56) References Cited

U.S. PATENT DOCUMENTS

| | | | |
|---|---|---|---|
| 9,124,527 B2 * | 9/2015 | Basso | ..................... H04L 45/44 |
| 2012/0131216 A1 | 5/2012 | Jain et al. | |
| 2013/0003739 A1 | 1/2013 | Raman et al. | |
| 2014/0064091 A1 * | 3/2014 | Basso | ................. H04L 45/7453 370/235.1 |
| 2014/0064281 A1 * | 3/2014 | Basso | ................. H04L 45/7453 370/392 |
| 2014/0064282 A1 * | 3/2014 | Basso | ................... H04L 45/742 370/392 |
| 2014/0247830 A1 * | 9/2014 | Kolbe | ..................... H04L 45/74 370/392 |

FOREIGN PATENT DOCUMENTS

| | | |
|---|---|---|
| CN | 102801820 A | 11/2012 |
| WO | WO-2009013582 A1 | 1/2009 |
| WO | WO-2013062906 A1 | 5/2013 |

OTHER PUBLICATIONS

Finlayson, Matthew, et al., "VPN Technologies—A Comparison", Data Connection, Feb. 2003. < http://www.cse.iitb.ac.in/~varsha/allpapers/network-misc/vpntechwp.pdf >.

* cited by examiner

*Primary Examiner* — Brian Roberts
(74) *Attorney, Agent, or Firm* — Mannava & Kang, P.C.

(57) ABSTRACT

According to an example, in a method for MAC address distribution by an apparatus, a MAC address is received in the apparatus, in which the apparatus includes a data store on which is stored a local slice set containing a plurality of slices, and in which each of the plurality of slices is assigned a respective slice identifier. An address value for the received MAC address may be determined and a correlation between the determined address value and one of the slice IDs of the plurality of slices may be identified. In addition, the received MAC address may be stored in the slice having the slice identifier identified as being correlated to the determined address value.

15 Claims, 5 Drawing Sheets

MAC ADDRESS DISTRIBUTION

CLAIM FOR PRIORITY

The present application claims the benefit of priority under 35 U.S.C 119 to Chinese Patent Application No. 201310138188.1, having a filing date of Apr. 19, 2013, the disclosure of which is hereby incorporated by reference in its entirety.

BACKGROUND

Techniques that are based on an Internet protocol (IP) core network to implement a Layer 2 virtual private network (VPN) in a site, such as a data center, have been gaining popularity. Generally speaking, these types of techniques implement a core network, a site network, and an overlay network. In addition, the routing and forwarding information are maintained on the edge devices of sites without requiring that the core network and the site network be changed. The site network is a Layer 2 network with independent service functionality and is connected to the core network through one or more edge devices and is typically managed and controlled by a single organization. The site network mainly includes a host and a switching device, and an edge device provides Layer 2 switching functionality between sites. The overlay network is a virtual network created between the edge devices of a site, which provides a Layer 2 interconnection between site networks. The edge devices inform one another of the media access control (MAC) addresses of all of the hosts and routers that are connected to the respective edge devices, and form a larger Layer 2 forwarding domain by interconnecting a plurality of site networks. The core network is a network that is mainly carried by an IP routing device and that provides interconnection between site networks.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
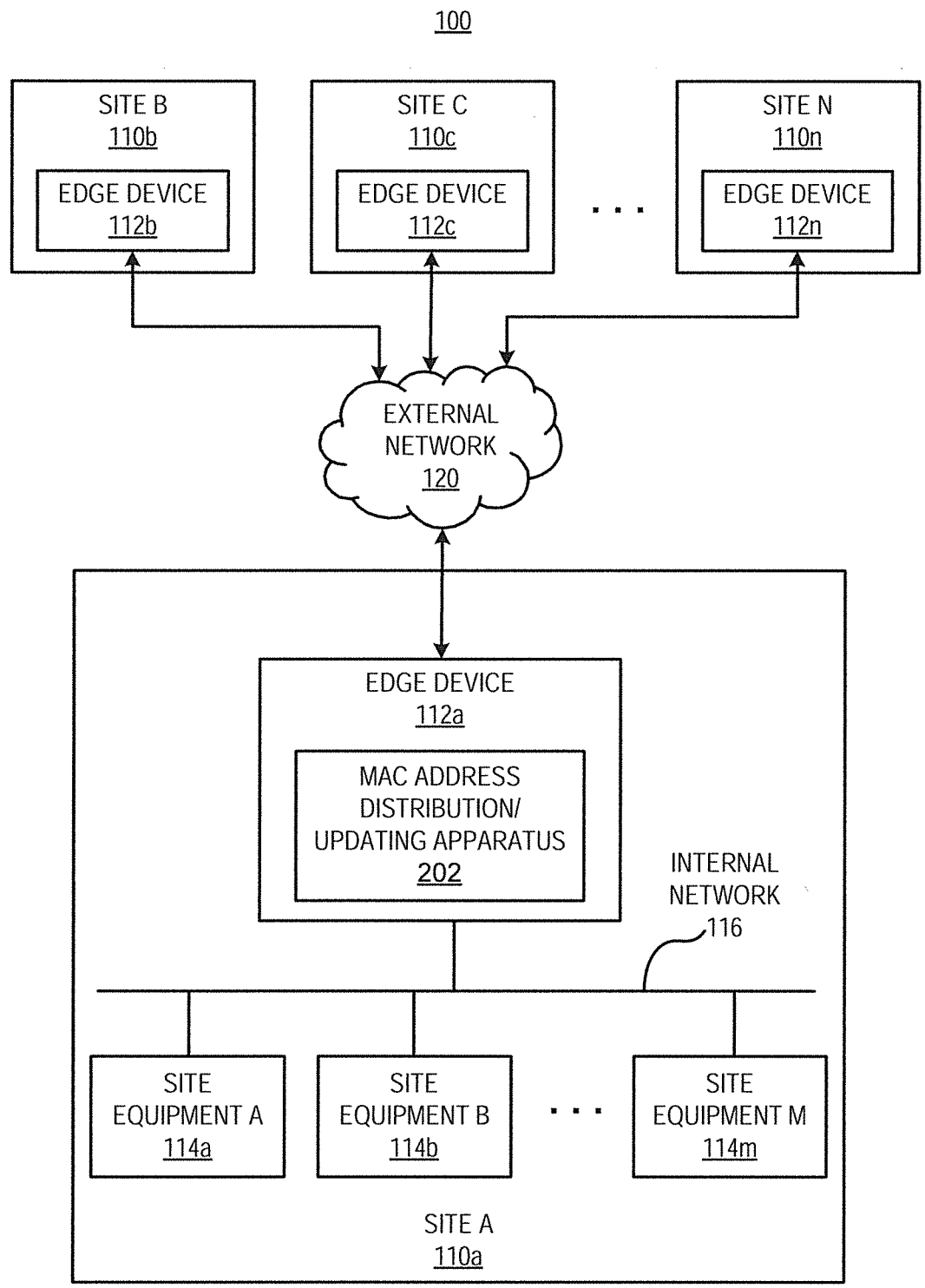
FIG. 1 is a simplified diagram of a networked environment, in which various aspects of the methods and apparatuses disclosed herein may be implemented, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are methods and apparatuses for media access control (MAC) address distribution, which may also include updating of MAC addresses in edge devices. As discussed in greater detail herein below, a MAC address may be received in the apparatus, in which the apparatus includes a data store on which is stored a local slice set containing a plurality of slices, and in which each of the plurality of slices is assigned a respective slice identifier (ID). In addition, an address value for the received MAC address may be determined, a correlation between the determined address value and one of the slice IDs of the plurality of slices may be identified, and the received MAC address may be stored in the slice having the slice ID identified as being correlated to the determined address value. A slice may be a designation to which a subset of a plurality of hardware addresses, for instance, 256 hardware addresses, of site equipment may be stored or assigned.

Through implementation of the methods and apparatuses disclosed herein, an edge device may store (or assign) the same MAC addresses in the same slices during multiple MAC address learning operations. As such, when the slices are distributed to remote edge devices, the remote edge devices may not perform a deleting operation of the MAC addresses before the MAC addresses are added. In one regard, therefore, traffic loss during the interim of when the MAC addresses are deleted and added may be avoided.

In contrast, in conventional wide area networks (WANs) that link multiple Layer 2 networks together, MAC address information between sites is typically released through a conventional inter-system to inter-system (ISIS) process. In this process, an edge device of a first site may learn of a new MAC address at an internal interface of a user virtual local area network (VLAN). In addition, an ISIS process stores the MAC address in a MAC address slice set having a plurality of slices that are each able to store a maximum number of MAC addresses. The edge device encapsulates information pertaining to these slices into a link state packet (LSP) and sends a LSP updating message containing the LSP to remote edge devices of an overlay network. The LSP updating message reaches the remote edge devices through head duplication or core duplication. In addition, the remote edge devices decapsulate the LSP updating message and a control plane ISIS process in each of the remote edge devices processes the decapsulated message.

Particularly, in the conventional WANs, the control plane ISIS process processes the message by parsing the slice information in the LSP. If information of the slice contained in the LSP has not been locally stored in a remote edge device, then the remote edge device may learn all of the MAC addresses contained in the slice. If information of the slice contained in the LSP has previously been stored locally in the remote edge device, the MAC addresses in the parsed slices may be compared one by one to the MAC addresses in the locally stored corresponding slices. If a newly added MAC address is contained in a slice, the newly added MAC address may be learned. However, if the MAC addresses in the locally stored slices do not exist in the parsed slices, the MAC addresses in the local storage of the remote edge device corresponding to the MAC address that do not exist in the parsed slices may be deleted from the local storage of the remote edge device.

In the conventional WANs, the MAC information released by an edge device to remote edge devices is typically controlled by an ISIS process on a master control panel. The ISIS process often stores the MAC addresses in the sequence of the slice ID into the slices according to the sequence in which the MAC addresses are learned. As such, when the number of MAC addresses stored in slice 1 reaches a maximum value for the slice, additional MAC addresses are stored in slice 2. Likewise, when the number of MAC addresses stored in slice 2 reaches the maximum value for the slice, additional MAC address are stored in slice 3, and so forth. The ISIS process also starts a sending task to encapsulate the slice information into an EVI MAC LSP to be sent to the remote edge devices.

In the conventional WANs, when a batch deletion event occurs, for instance, when all of the MAC addresses of a certain port, all of the MAC addresses of a certain VLAN, all of the MAC addresses of a system, etc., are deleted, an edge device will delete the previously learned MAC addresses and will learn the source MAC address again. The learning of the source MAC address may be slowed by user traffic limitations and thus, there may be a gap in time between when the previously learned MAC address is deleted and the source MAC address is learned again. Since the delay event lasts for a short time, the ISIS process will not immediately inform other edge devices to delete the MAC addresses, but the ISIS process informs other edge devices to update the MAC addresses only when the update time expires. The newly learned MAC addresses have a changed sequence and thus, it is possible in the conventional WANs that the conventional manner of storing MAC addresses in edge devices results in the slice at which each MAC address is located is different from the slices at which the MAC addresses were stored prior to the current learning process. As such, when these new slices are sent to remote edge devices of remote site networks, the remote edge devices perform a deleting operation of the MAC addresses prior to adding the MAC addresses as discussed above. The performance of the deleting operation may result in traffic loss.

By way of particular example in which each slice has a maximum capacity of one MAC address, a first MAC address (MAC1) is originally in slice 1, a second MAC address (MAC2) is originally in slice 2, but in a new message, MAC2 is in slice 1 and MAC1 is in slice 2. In this example, when the remote edge device processes the new message containing slice 1, MAC1 in slice 1 of the local storage in the remote edge device will be deleted because the slice previously corresponding to MAC1 is slice 1. After deleting MAC1 from slice 1 in the local storage, the entire hardware address space will no longer include MAC1, and thus the traffic corresponding to MAC1 will be lost in hardware. The remote edge device may then add MAC2 into slice 1 in the local storage, so the slice ID corresponding to address MAC2 is 1. In addition, when the remote edge device processes the new message containing slice 2, the remote edge device discovers that the MAC address of slice 2 in the local storage is MAC2, while in the new message, the MAC address of slice 2 is MAC1. In this example, the remote edge device deletes MAC2 from slice 2 in the local storage at this time because when processing the message of slice 1, MAC2 has already been added into slice 1. As such, MAC2 may always exist in the hardware and traffic corresponding to MAC2 may not be lost. In addition, MAC1 is added into slice 2 of the local storage and the slice ID corresponding to MAC1 is set to be slice 2, thus completing a LSP update. It may be seen that transmission of the MAC addresses in different slices as is typically done in conventional WANs may result in traffic loss.

In addition, in a conventional system having a main panel/standby panel environment, if the main panel and the standby panel learn the MAC addresses through distributed MAC address learning, the standby panel may learn the MAC addresses in a different sequence from the main panel. As such, the slice information on the main panel may be different from the slice information on the standby panel, i.e., different MAC addresses will be stored in the slices having the same numbers in the main panel and the standby panel. After a main panel/standby panel switching occurs, the standby panel becomes a main panel and sends its own MAC slice information to each of the remote edge devices. As discussed above, the differences in the MAC addresses stored in the different slices may cause the remote edge devices to perform a deleting operation of some of the MAC address in the local storages of the remote edge devices before the MAC addresses are added to the local storages upon discovering that the MAC addresses in the slices are different from the MAC addresses in the locally stored slices, which may result in traffic loss.

With reference first to FIG. 1, there is shown a simplified diagram of a networked environment 100, in which various aspects of the methods and apparatuses disclosed herein may be implemented, according to an example. It should be understood that the networked environment 100 depicted in FIG. 1 may include additional elements and that some of the elements depicted therein may be removed and/or modified without departing from a scope of the networked environment 100.

The networked environment 100 is depicted as including a plurality of sites 110a-110n (the variable "n" may represent an integer greater than 1) that are connected to each other through an external network 120. The sites 110a-110n may be respective data centers or other groups of computing equipment and are to communicate data among each other over the external network 120, which may be the Internet and/or another type of network. Thus, for instance, the sites 110a-110n may be data centers that are remotely located from each other, for instance, in different buildings, different cities, different states, different countries, etc., and may be interconnected via a WAN. Site A 110a is depicted as including an edge device 112a and a plurality of site equipment 114a-114m (the variable "m" may represent an integer greater than 1). Each of the other sites B-N 110b-110n is also depicted as including a respective edge device 112b-112n. Although not shown, each of the other sites B-N 110b-110n may also have respective site equipment and internal networks.

The site equipment 114a-114m may be electronic components that are known to be implemented in networked sites, such as data centers. By way of example, the site equipment 114a-114m may be any of physical servers, data storage devices, network switches, routers, hubs, power supplies, access points, etc., or a combination of these types of components. As shown in FIG. 1, the site equipment 114a-114m may be in communication with each other and the edge device 112a through an internal network 116, which may be a wired or wireless local area network. The site equipment 114a-114m and the edge device 112a may implement a Layer 2 virtual private network. The edge device 112a may be a router that communicates to and receives data from the other sites 110b-110n. The other sites 110b-110n may have similar arrangements between site equipment and the edge devices 112b-112n and the edge devices 112a-112n may provide Layer 2 switching functionality between the sites 110a-110n. In addition, an overlay network may be created between the edge devices 112a-112n of the sites 110a-110n to provide Layer 2 interconnection between the internal networks 116 of the sites 110a-110n over a WAN, such that the sites 110a-110n, which may be geographically dispersed with respect to each other, may together act similarly to a single LAN.

According to an example, the edge devices 112a-112n may implement an Ethernet virtual interconnection (EVI) network over the external network 120. In other words, the edge devices 112a-112n may be edge devices in an EVI network. In another example, the edge devices 112a-112n may implement an Overlay Transport Virtualization (OTV) technique. EVI, for instance, may be used to implement a Layer 2 virtual private network (L2VPN) technique based on an Internet Protocol (IP) core network. A VPN instance may be established among the different edge devices 112a-112n. According to an example, an overlay network may be used to facilitate VLAN expansion across geographically dispersed sites. The overlay network generally includes an overlay interface and virtual links to carry Layer 2 traffic between sites. For example, the virtual links may be any communication channels over a Layer 3 core network. In one example, a physical communication medium may be virtualized to include multiple communication channels such that traffic of one communication channel is separated from that of a different communication channel (e.g., using a suitable identifier). The virtual link may be a Layer 2 virtual link (e.g., virtual Ethernet link) tunneled through the Layer 3 network using any suitable protocol (e.g., EVI and Generic Routing Encapsulation (GRE), etc.). Layer 2 traffic between sites may be encapsulated with an IP header ("MAC in IP") to reach its destination via the core network. Traffic may be forwarded in the core network based on the IP header.

Figure 2:
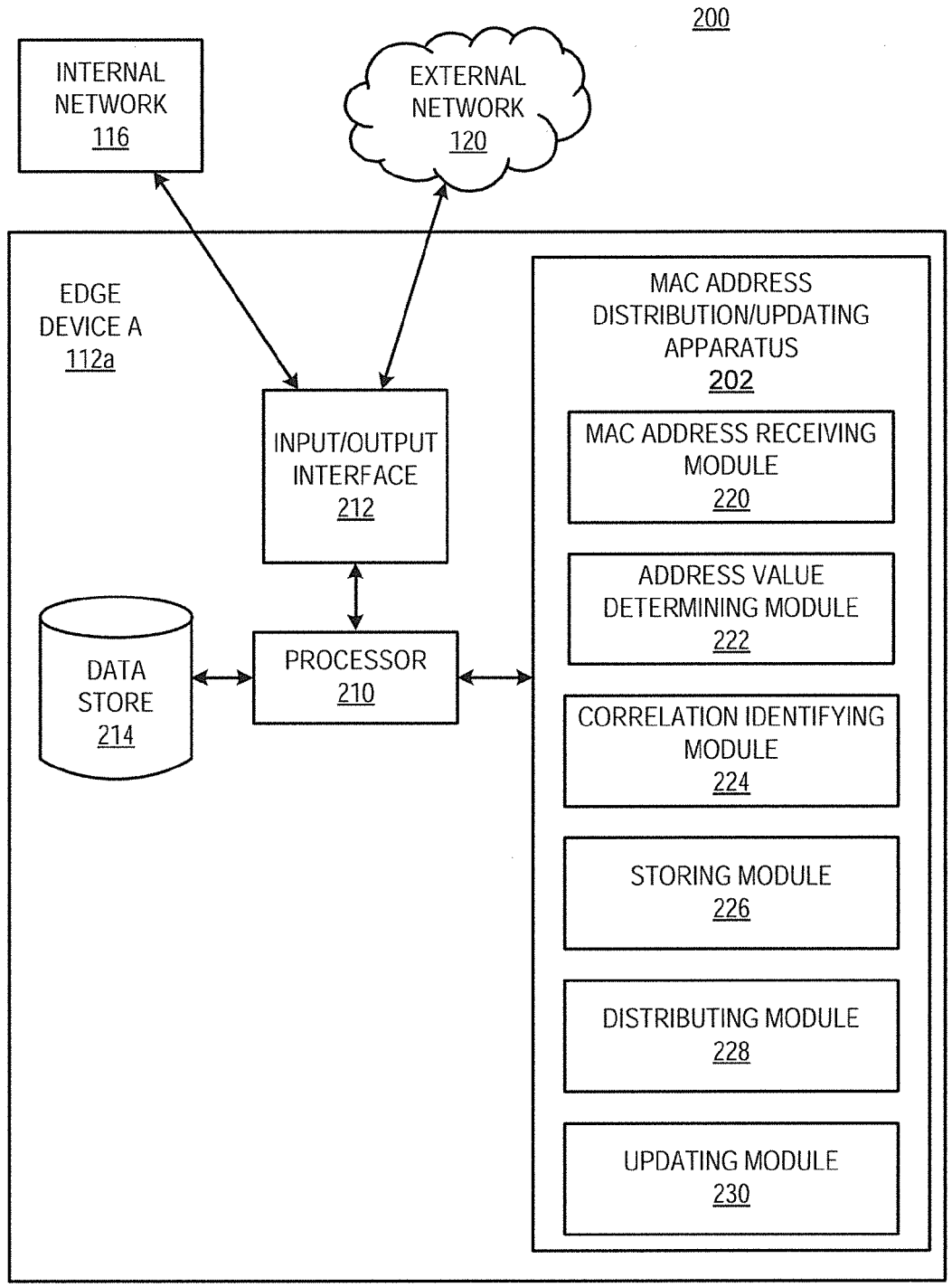
FIG. 2 is a simplified block diagram of the edge device depicted in FIG. 1, according to an example of the present disclosure.

According to an example, the edge devices 112a-112n may collect and store the media access control (MAC) addresses of the site equipment 114a-114m respectively connected to the edge devices 112a-112n. Particularly, the edge devices 112a-112n may each include a MAC address distribution/updating apparatus 202, which is described in greater detail herein below with respect to FIG. 2. The MAC address distribution/updating apparatus 202 may store the MAC addresses in a MAC address slice set in a manner that causes the MAC addresses to be respectively stored in the same slices each time that the MAC addresses are stored by the edge devices 112a-112n. By way of example, the edge devices 112a-112n may each maintain a MAC address slice set having 256 slices, in which each slice may include 256 hardware addresses. The correlations between the hardware addresses and the slices to which the hardware addresses correspond may be stored in a memory, such as a data store 214 (FIG. 2). As discussed in greater detail herein below, the MAC addresses of the site equipment 114a-114m may be stored in particular ones of the slices each time the MAC addresses are stored such that the MAC addresses may be stored in the same ones of the slices. Thus, for instance, when a MAC address stored in a particular slice is updated, the MAC address may be re-stored in the same particular slice. In one regard, therefore, when the slices of an edge device 112a are sent to the edge devices 112b-112n in the other sites 110b-110n, the edge devices 112b-112n may not need to perform a deleting operation prior to adding the same MAC address, which may avoid traffic loss.

By way of particular example, the edge devices 112a-112n of the sites 110a-110n may each support a hardware address space of 64K and the hardware address space may be divided evenly according to the hardware address space mapping to the slice set. For instance, assuming that the 64K hardware address space is 0x0000-0xFFFF, the hardware address values corresponding to slice 1 may be 0x0000-0x00FF, the hardware address values corresponding to slice 2 may be 0x0100-0x01FF, the hardware address values corresponding to slice FF may be 0xFF00-0xFFFF, and so forth. As such, each hardware address value may have a unique corresponding slice identifier (ID), such as a number, or other identifier, while each slice ID may have a number of corresponding hardware address values. For instance, the slice ID corresponding to the hardware address value 0xFEFE may be slice 255 and the slice ID corresponding to the hardware address value 0xFFFE may be 256. Table 1 below shows the slices of a 64K hardware address space according to an example and provides an example of the mapping relation of each slice in the address space range.

TABLE 1

| Slice 1 | Slice 2 | ... | Slice 255 | Slice 256 |
|---------|---------|-----|-----------|-----------|
| 0x0000  | 0x0100  | ... | 0xFE00    | 0xFF00    |
| 0x0001  | 0x0101  | ... | 0xFE01    | 0xFF01    |
| ...     | ...     | ... | ...       | ...       |
| ...     | ...     | ... | ...       | ...       |
| 0x00FE  | 0x01FE  | ... | 0xFEFE    | 0xFFFE    |
| 0x00FF  | 0x01FF  | ... | 0x FEFF   | 0x FFFF   |

The edge device 112a may also inform the remote edge devices 112b-112n in the other sites 110b-110n of the MAC addresses of the site equipment 114a-114m contained in the first site 110a. Particularly, for instance, the edge device 112a may distribute a slice containing a learned MAC address to the remote edge devices 112b-112n. The edge device 112a may also distribute multiple slices containing multiple learned MAC addresses to the remote edge devices 112b-112n. The edge device 112a may distribute the MAC addresses contained in the slice (or slices) by encapsulating the MAC address information contained in the slice (or slices) as well as the slice information into a link state packet (LSP) and sending an LSP updating message to the remote edge devices 112b-112n in the other sites 110a-110n over the external network 120. The LSP updating message may reach the remote edge devices 112b-112n, for instance, through head duplication or core duplication.

The remote edge devices 112b-112n may receive and decapsulate the LSP updating message to determine the slices contained in the LSP. The remote edge devices 112b-112n may also update the stored MAC addresses in the same slice according to the MAC address stored in the slices. Thus, the MAC addresses of the site equipment 114a-114m in a first site 110a may be stored in the same slice IDs in each of the edge devices 112a-112n. According to an example, the same slice stored in a remote edge device 112b refers to the same slice in the slice set stored in the remote edge device 112b and corresponding to a current edge device 112a. For example, a third edge device 112c may receive a slice 1 from a first edge device 112a and a slice 1 from a second edge device 112b. When the third edge device 112c performs an updating operation according to the received slice 1 sent by the first edge device 112a, the third edge device 112c may search each of the locally stored slice sets for a slice set corresponding to the first edge device 112a and may update the MAC address stored in slice 1 in the slice set found according to the MAC address in slice 1. Likewise, when the third edge device 112c performs an updating operation according to the received slice 1 sent by the second edge device 112b, the third edge device 112c may perform the updating operation to the locally stored slice 1 corresponding to the second edge device 112b.

In one regard, the edge devices 112a-112n may store the same MAC address of equipment contained in remote sites in the same slice each time an updating operation is performed. As such, the edge devices 112a-112n, when functioning as remote edge devices, may not need to perform a deleting operation of the MAC address prior to adding the MAC address to thereby ensure traffic continuity among the edge devices 112a-112n.

Turning now to FIG. 2, there is shown a simplified block diagram 200 of the edge device 112a depicted in FIG. 1, according to an example. It should be understood that the edge device 112a depicted in FIG. 2 may include additional elements and that some of the elements depicted therein may be removed and/or modified without departing from a scope of the edge device 112a. In addition, it should be understood that some or all of the remote edge devices 112b-112n may have configurations similar to the edge device 112a.

As shown in FIG. 2, the edge device 112a may include the MAC address distribution/updating apparatus 202, a processor 210, an input/output interface 212, and a data store 214. The MAC address distribution/updating apparatus 202 is also depicted as including a MAC address receiving module 220, an address value determining module 222, a correlation identifying module 224, a storing module 226, a distributing module 228, and an updating module 230.

The processor 210, which may be a microprocessor, a micro-controller, an application specific integrated circuit (ASIC), or the like, is to perform various processing functions in the edge device 112a. The processing functions may include invoking or implementing the MAC address distribution/updating apparatus 202 and particularly, the modules 220-230 of the MAC address distribution/updating apparatus 202, as discussed in greater detail herein below. According to an example, the MAC address distribution/updating apparatus 202 is a hardware device on which is stored various sets of machine readable instructions. The MAC address distribution/updating apparatus 202 may be, for instance, a volatile or non-volatile memory, such as dynamic random access memory (DRAM), electrically erasable programmable read-only memory (EEPROM), magnetoresistive random access memory (MRAM), memristor, flash memory, floppy disk, a compact disc read only memory (CD-ROM), a digital video disc read only memory (DVD-ROM), or other optical or magnetic media, and the like, on which software may be stored. In this example, the modules 220-230 may be software modules, e.g., sets of machine readable instructions, stored in MAC address distribution/updating apparatus 202.

In another example, the MAC address distribution/updating apparatus 202 may be a hardware component, such as a chip, and the modules 220-230 may be hardware modules on the hardware component. In a further example, the modules 220-230 may include a combination of software and hardware modules.

The processor 210 may store data in the data store 214 and may use the data in implementing the modules 220-230. For instance, correlations between the hardware address values and the slices in the slice set may be stored in the data store 214, e.g., as shown in Table 1 above. In addition, the slices in which the MAC addresses of the site equipment 114a-114m are stored may also be stored in the data store 214. The data store 214 may be volatile and/or non-volatile memory, such as DRAM, EEPROM, MRAM, phase change RAM (PCRAM), memristor, flash memory, and the like. In addition, or alternatively, the data store 214 may be a device that may read from and write to a removable media, such as, a floppy disk, a CD-ROM, a DVD-ROM, or other optical or magnetic media.

The input/output interface 212 may include hardware and/or software to enable the processor 210 to communicate with the site equipment 114a-114m in the internal network 116 and/or the edge devices 112b-112n in the other sites 110b-11n over the external network 120. The input/output interface 212 may include a network interface card and may also include hardware and/or software to enable the processor 210 to communicate with various input and/or output devices (not shown), such as a keyboard, a mouse, a display, etc., through which a user may input instructions into the edge device 112a and may view outputs from the edge device 112a.

Figure 3:
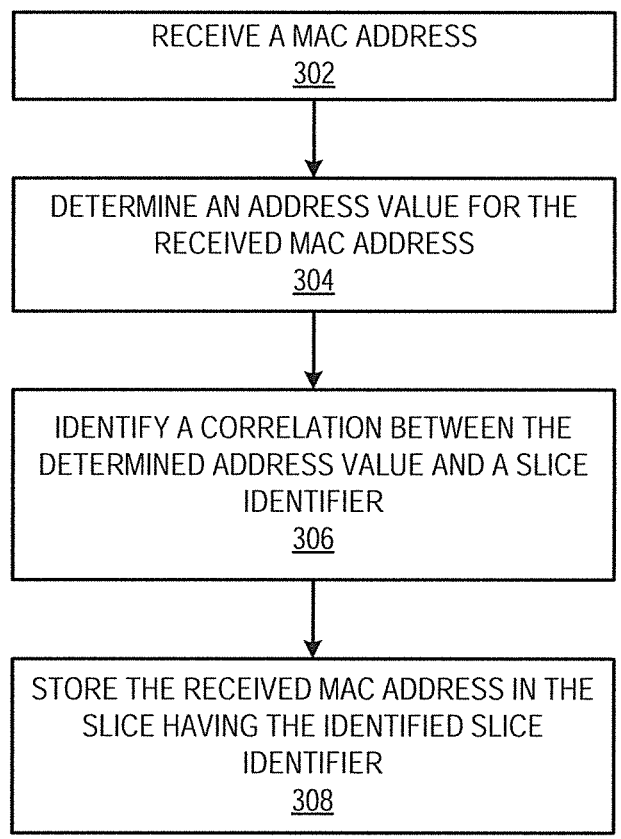
FIGS. 3 and 4, respectively, are flow diagrams of methods for MAC address distribution by an apparatus, according to two examples of the present disclosure.
Figure 4:
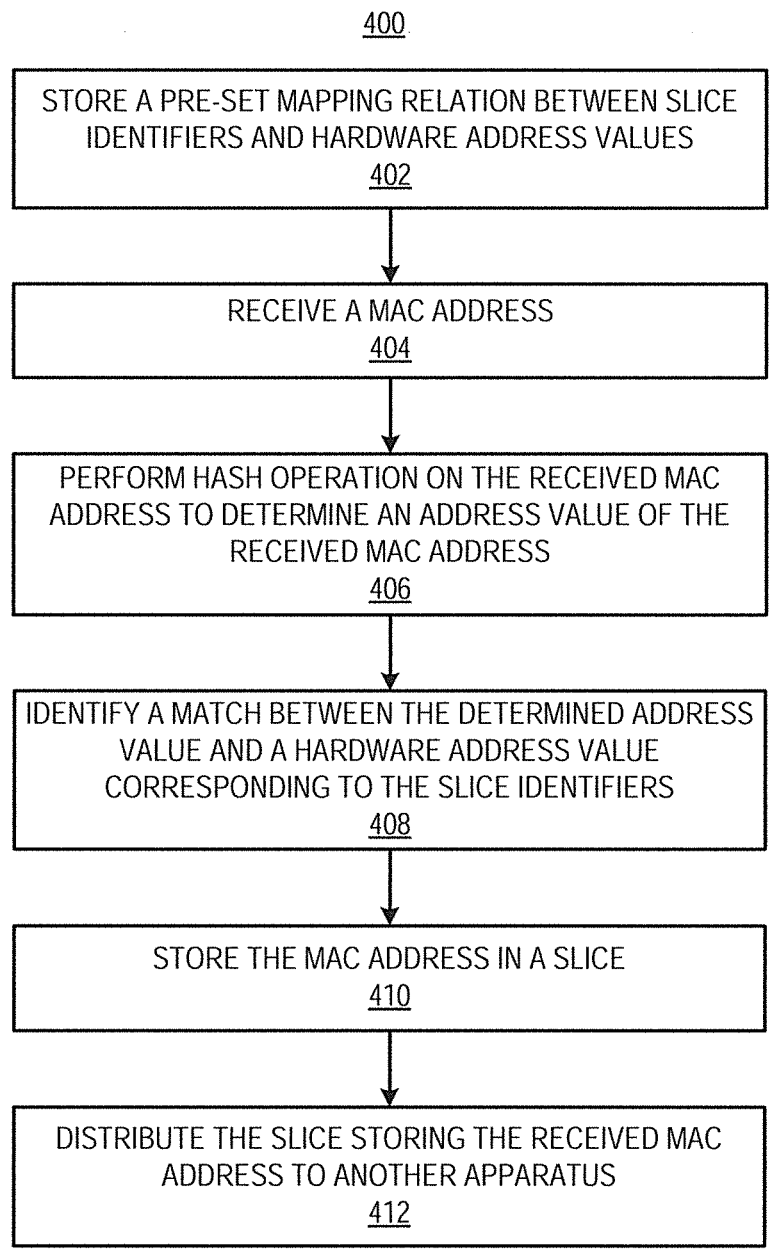
Figure 5:
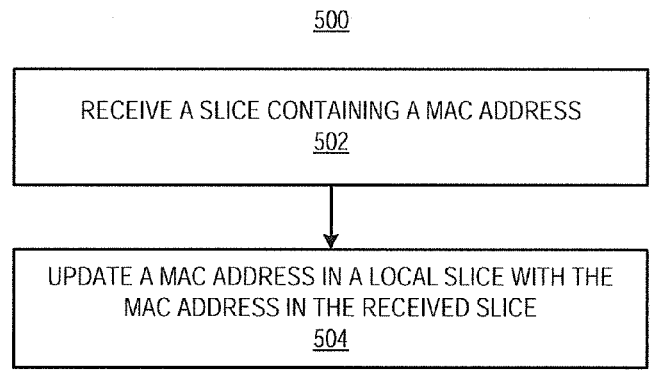
FIG. 5 is a flow diagram of a method for MAC address updating by an apparatus, according to an example of the present disclosure.

Various manners in which the processor 210 in general, and the modules 220-230 in particular, may be implemented are discussed in greater detail with respect to the methods 300, 400, and 500 respectively depicted in FIGS. 3-5. Particularly, FIGS. 3 and 4, respectively, depict flow diagrams of methods 300 and 400 for MAC address distribution by an apparatus, such as an edge device 112a, according to two examples. In addition, FIG. 5 depicts a flow diagram of a method 500 for MAC address updating by an apparatus, such as an edge device 112b, according to an example. It should be apparent to those of ordinary skill in the art that the methods 300, 400, and 500 represent generalized illustrations and that other operations may be added or existing operations may be removed, modified, or rearranged without departing from the scopes of the methods 300, 400, and 500. Generally speaking, the processor 210 depicted in FIG. 2 may implement the each of methods 300, 400, and 500 through implementation of at least some of the modules 220-230.

With reference first to FIG. 3, at block 302, a MAC address may be received in an apparatus (e.g., edge device 112a). For instance, the processor 210 may implement the MAC address receiving module 220 to receive the MAC address of a site equipment 114a that is to be learned either from the site equipment 114a or from another entity. As discussed above, the edge device 112a may include a data store 214 on which is stored a local slice set containing a plurality of slices, in which each of the plurality of slices is assigned a respective slice ID.

At block 304, an address value for the received MAC address may be determined. For instance, the processor 210 may implement the address value determining module 222 to determine the address value for the received MAC address. Generally speaking, the address value may be determined to correlate the received MAC address with a hardware address value assigned to the slices in the slice set stored in the data store 214. For instance, the determined address value may have a similar format to the hardware address values corresponding to the slices.

The address value of the received MAC address may be determined in any of a variety of manners. In a first example, a hash operation may be performed on the MAC address to determine the address value for the MAC address, in which the address value for the MAC address matches one of the hardware address values in the slices. For instance, an appropriate hash operation may transform a 48-bit (binary) MAC address into an address value of a 16-bit (binary) address space. It should be understood that any suitable hash operation that results in the address value for the MAC address matching a hardware address value of the slices may be performed on the MAC address. In addition, the respective slice in which the matching hardware address value resides may be determined based upon a mapping relation of the hardware address values and the slices, for instance, as discussed above with respect to Table 1. As such, each of the MAC addresses may correspond to a particular one of the slices and so long as the same hash operation is performed on the MAC addresses, the slices determined for the MAC addresses may remain the same even when the MAC addresses are updated.

In another example, predetermined digits in the hardware address value may be used as the slices to which the MAC address corresponds. For example, the third to fourth digits in the hardware address space value 0xXXXX obtained may be used as the slices corresponding to the MAC addresses. In the example shown in Table 1, the slices corresponding to the MAC addresses may be obtained by obtaining any four (e.g., the last four) hexadecimal digits among the last six hexadecimal digits ($23^{rd}$-$47^{th}$ bits) of the MAC address to be used as the last four bits of the hardware address space value (i.e., 0xXXXX). In this example, the third to fourth hexadecimal digits counting from the right of the MAC address are determined to be the corresponding slices of the MAC addresses. For example, the corresponding slice for the MAC address 05-16-DC-FE-C2-34 is C2 (slice 195).

In some examples, a site 110a may have far fewer than 64K site equipment 114a-114m and thus, a subset of all of the available slices may need to be selected as a slice set of the site 110a. By way of particular example in which site 110a includes 1500 site equipment 114a-114m and thus 1500 MAC addresses, the edge device 112a may select eight slices from slice 1 to slice 8, in which each slice is able to store 256 MAC addresses at most, as the corresponding slice set for the site 110a. In this example, a hash operation that causes the values of the MAC addresses to be mapped into the range (0x000-0x07FF) of the hardware address space may be selected to determine the address values of the MAC addresses.

For instance, the hash operation may be one that causes a value X corresponding to the $43^{rd}$-$47^{th}$ bits (the last bit of hexadecimal digit in the MAC address) of the MAC address to be obtained. In this example, if the value X is a value from 0-7, the third digit and the fourth digit of the hash operation result for the MAC address value are 0 and X, respectively, i.e., 0x0X. Namely, it is considered that the slice ID corresponding to the MAC address is X+1. In addition, if the value X is a value from 8-F, the third digit and the fourth digit of the hash operation result for the MAC address value are 0 and X-8, respectively, i.e., 0x0X. Namely, it is considered that the slice ID corresponding to the MAC address value is X-8+1, in which, the fifth and sixth digits may be any value, for example, the $31^{st}$-$39^{th}$ digits of the MAC address. In this example, therefore, the slice corresponding to the MAC address value may be obtained and thus, any hash operation that is able to cause the third bit of the hardware address value obtained through application of the hash operation to be 0 and the fourth bit of the hardware address value obtained through application of the hash operation to be a number from 0-7, while making the results of several computations be consistent with each other, may be selected.

At block 306, a correlation between the determined address value for the received MAC address and one of the slice IDs of the plurality of slices may be identified. For instance, the processor 210 may implement the correlation identifying module 224 to identify which of the hardware address values the determined address value matches. In addition, the slice ID corresponding to the matching hardware address value may be identified as the slice ID corresponding to the determined address value.

An example will now be provided in which the received MAC address is 05-16-DC-FE-C2-34. In this example, the processor 210 may obtain a value "4," which corresponds to the $43^{rd}$-$47^{th}$ bits of the MAC address 05-16-DC-FE-C2-34 (the last hexadecimal digit of the MAC address). The processor 210 may also determine that the value 4 is within 0-7, that the result of the MAC address computation is 0x04C2, and that the corresponding slice ID is 5. According to the algorithm above, when the processor 210 determines that the value corresponding to the $43^{rd}$-$47^{th}$ bits of the MAC address is within 0-7, the processor 210 may consider that the slice ID corresponding to the MAC address is X+1, in which case the slice ID corresponding to 05-16-DC-FE-C2-34 is 4+1=5.

According to another example, the correlation between the determined address value and one of the slice IDs may be a correlation determined the first time the MAC address is assigned to a slice. That is, the MAC address may have been assigned to a particular slice during a first learning operation. In this example, that original correlation may be maintained such that the MAC address is always correlated to the particular slice.

At block 308, the received MAC address may be stored in the slice having the slice ID identified as being correlated to the determined address value. For instance, the processor 210 may implement the storing module 226 to store the received MAC address in the slice to which the received MAC address corresponds.

Turning now to FIG. 4, at block 402, a pre-set mapping relation between slice IDs and hardware address values may be stored, for instance, in the data store 214. That is, for instance, a user may designate a respective range of hardware address values that correspond to each of the slice IDs and this mapping relation may be stored in the data store 214. An example of the pre-set mapping relation is provided above in Table 1.

At block 404, a MAC address may be received in an apparatus (e.g., the edge device 112a). For instance, the processor 210 may implement the MAC address receiving module 220 to receive the MAC address of a site equipment 114a that is to be learned either from the site equipment 114a or from another entity.

At block 406, a hash operation may be performed on the received MAC address to determine an address value of the received MAC address. Various manners in which the hash operation may be performed to determine the address value of the received MAC address are discussed above with respect to block 304 in FIG. 3.

At block 408, a match between the determined address value and a hardware address value corresponding to the slice IDs may be identified. For instance, the processor 210 may implement the correlation identifying module 224 to compare the determined address value with the hardware address values stored in the data store for a match. In addition, the processor 210 may identify the slice ID corresponding to the matching hardware address value as the slice ID to which the determined address value corresponds.

At block 410, the received MAC address may be stored in the slice having the slice ID identified as being correlated to the determined address value. For instance, the processor 210 may implement the storing module 226 to store the received MAC address in the slice to which the received MAC address corresponds.

As discussed above, each of the slices may have a maximum capacity of MAC addresses that may be stored in the slices. For instance, each of the slices may have a maximum capacity of 256 MAC addresses. In various instances, such as due to the algorithm used to determine the address values of received MAC addresses, the MAC addresses may be non-uniformly distributed among the slices resulting in the number of MAC addresses stored in a slice exceeding the maximum capacity of the slice. According to an example, the processor 210 may determine whether the slice identified at block 408 has reached its maximum capacity. In response to a determination that the identified slice has not reached its maximum capacity, the received MAC address may be stored in the identified slice. However, in response to a determination that the identified slice has reached its maximum capacity, the received MAC address may be stored in a reserved slice. That is, one of the slices stored in the data store may be identified as a reserved slice that is reserved to hold MAC addresses that correspond to slices that have reached their maximum capacities. In addition to the received MAC address being stored in the reserved slice, the slice to which the received MAC address corresponds may be stored in the reserved slice.

At block 412, the slice storing the received MAC address may be distributed to another apparatus. For instance, the processor 210 may distribute the slice storing the received MAC address to the remote edge devices 112b-112n through the external network 120. As such, for instance, the processor 210 may distribute the slice to which the received MAC address has been determined to correspond and/or the reserved slice containing the received MAC address to the remote edge devices 112b-112n. By way of example, the edge device 112a may distribute the MAC address contained in the slice by encapsulating the MAC address information contained in the slice as well as the slice information, i.e., slice ID, into a link state packet (LSP) and may send an LSP updating message to the edge devices 112b-112n in the other sites 110a-110n over the external network 120. The LSP updating message may reach the remote edge devices 112b-112n, for instance, through head duplication or core duplication.

In the example in which the edge device 112a includes the reserved slice, each of the remote edge devices 112b-112n may also include a reserved slice. That is, similarly to the edge device 112a, one of the slices in each of the remote edge devices 112b-112n may be a reserved slice. In addition, when the remote edge devices 112b-112n receive a reserved slice containing a MAC address, the remote edge devices 112b-112n may store the MAC address in the reserved slices of the remote edge devices 112b-112n. In this regard, the remote edge devices 112b-112n may add the MAC address in the corresponding slice without performing a deleting operation, thus avoiding traffic loss as discussed above.

Turning now to FIG. 5, at block 502, an apparatus may receive a slice containing a MAC address from another apparatus. Thus, for instance, a second edge device 112b in a second site 110b may receive a slice containing a MAC address of a site equipment 114a from a first edge device 112a in a first site 110a. Particularly, for instance, a processor 210 in the second edge device 112b may implement the updating module 230 of the second edge device 112b to receive an LSP containing the slice and the slice information from the first edge device 112a. The slice received at block 502 may include either or both of a slice and a reserved slice.

At block 504, the MAC address in the local slice of the second edge device 112b may be updated with the MAC address contained in the received slice. That is, for instance, the second edge device 112b may have stored in a data store 214 thereof, a plurality of slices containing MAC addresses corresponding to the equipment in the first site 110a. The slices stored in the data store 214 of the second edge device 112b may be stored in similar manners to the slices in the data store 214 of the first edge device 112a. In addition, the slices stored in the data store 214 of the second edge device 112b may be stored in similar manners to the slices in the data store 214 of a third edge device 112c. Thus, for instance, the data store 214 of the second edge device 112b may store slices corresponding to the slices in the data store 214 of the first edge device 112a, in which the respective slices in the second edge device 112b contain the same MAC addresses as the corresponding slices in the first edge device 112a following an updating operation. By way of particular example, slice 1 for the first edge device 112a stored in the second edge device 112b may contain the same MAC addresses as slice 1 stored in the first edge device 112a. Likewise, slice 1 for the third edge device 112c stored in the second edge device 112b may contain the same MAC addresses as slice 1 stored in the third edge device 112c. The second and third edge devices 112b, 112c may also include respective reserved slices, which may be updated at the same time as the other slices.

In updating the MAC address in the locally stored slice, the processor 210 in the second edge device 112b may implement the updating module 230 in the second edge device 112b to decapsulate the LSP updating message to the determine the slice ID contained in the LSP updating message. The processor 210 may then replace the MAC addresses currently stored in the locally stored slice corresponding to the determined slice ID with the MAC addresses contained in the decapsulated LSP updating message.

As previously discussed, the second edge device 112b may store a slice 1 from the first edge device 112a, a slice 1 from the third edge device 112c, and so forth. In this regard, when the second edge device 112b receives a LSP containing a slice 1 corresponding to the first edge device 112a, the processor 210 in the second edge device 112b may search each of the slice sets stored in the second edge device 112b for the slice 1 corresponding to the first edge device 112a and may update the MAC addresses contained in that slice. Likewise, when the second edge device 112b receives a LSP containing a slice 1 corresponding to the third edge device 112c, the processor 210 in the second edge device 112b may search each of the slice sets stored in the second edge device 112b for the slice 1 corresponding to the third edge device 112c and may update the MAC address contained in that slice.

As a particular example in which a batch deletion event occurs in the first edge device 112a or a standby panel is upgraded to be the main panel, in which the main and standby panels have different MAC address slice information, the processor 210 in the first edge device 112a may implement either the method 300 or 400. By way of particular example, each time the processor 210 of the first edge device 112a learns a MAC address, the processor may store all of the MAC addresses whose $43^{rd}$-$47^{th}$ bits have a value 4 or C in slice 5 (according to the example algorithm discussed above, both 4 and C correspond to slice ID 5). When a remote edge device, e.g., second edge device 112b, updates its locally stored slice 5' according to the slice 5 received from the first edge device 112a, because each of the MAC addresses in the locally stored slice 5' exists in slice 5 received from the first edge device 112a, the second edge device 112b may not delete any MAC addresses from the locally stored slice 5'. Similarly, because the first edge device 112a may store all of the MAC addresses whose $43^{rd}$-$47^{th}$ bits have a value 4 or C in slice 5, other slices may not include any MAC address whose $43^{rd}$-$47^{th}$ bits have a value 4 or C. As such, the second edge device 112b may not again learn any MAC addresses whose $43^{rd}$-$47^{th}$ bits have a value 4 or C when updating the locally stored slices 6', 7', and 8' according to the slices 6, 7, and 8 received from the first edge device 112a. Therefore, the second edge device 112b may not perform an operation of deleting before adding on the same MAC address when updating each of the corresponding locally stored slices according to the slices sent by the first edge device 112a, thereby avoiding a corresponding traffic loss.

By way of particular example, the first edge device 112a may select 9 slices from slice 1 to slice 9 as the slice set corresponding to the first site 110a, in which slice 9 serves as a reserved slice. As such, the result of the computation on any MAC address should not be directly mapped to slice 9. In this example, when the processor 210 in the first edge device 112a determines that the number of MAC addresses in slice 5 corresponding to the currently learned MAC address 05-16-DC-FE-C2-34 has reached a maximum capacity of the slice, e.g., 256 addresses, the processor 210 may store the MAC address 05-16-DC-FE-C2-34 as well as the slice ID 5 corresponding to the MAC address into the reserved slice, i.e., slice 9. In addition, when the processor 210 of the first edge device 112a is triggered to send the MAC address information in the first site 110a, the processor 210 may encapsulate each of the slices, including the reserved slice 9, into an LSP message to be sent to the second edge device 112b. The second edge device 112b may receive the LSP message and may update all of the MAC addresses corresponding to slice ID 5 in the locally stored slice 5' and slice 9' according to the MAC address of the received slice 5 and the MAC address corresponding to slice ID 5 in slice 9.

Particularly, if the processor 210 in the second edge device 112b previously stored the MAC address 05-16-DC-FE-C2-34 in slice 5', when the processor 210 updates MAC addresses corresponding to slice ID 5 in slice 5' and reserved slice 9' according to the currently received slice 5 and the reserved slice 9, although the current slice 5 does not store the MAC address 05-16-DC-FE-C2-34, the reserved slice 9 stores this MAC address. As such, the processor 210 in the second edge device 112b may not delete the MAC address stored in slice 5', thus avoiding loss of traffic corresponding to said MAC address.

However, if the processor 210 in the second edge device 112b previously stored the MAC address 05-16-DC-FE-C2-34 in slice 9', when the processor 210 updates MAC addresses corresponding to slice ID 5 in slice 5' and reserved slice 9' according to the currently received slice 5 and the reserved slice 9, because the MAC address corresponding to slice ID 5 stored in the reserved slice 9 includes the MAC address, the processor 210 may not delete the MAC address stored in slice 9'.

In addition, if the processor 210 in the first edge device 112a stored another MAC address 05-16-DC-FE-C2-3C in slice 9 in a previous learning operation, and stores the another MAC address in slice 5 in a current learning operation, when the processor 210 in the second edge device 112b updates the locally stored slice 5' and slice 9' according to the current slice 5 and slice 9 (suppose that in the slice set stored in the second edge device 112b, the MAC address 05-16-DC-FE-C2-3C is also stored in slice 9'), although slice 5' does not store the MAC address 05-16-DC-FE-C2-3C, slice 9' stores this MAC address. As such, the processor 210 in the second edge device 112b may not add the MAC address to slice 5'. In one regard, therefore, the operation of deleting other MAC addresses owing to an insufficient capacity of slice 5' caused by adding the MAC address may be avoided, and loss of traffic corresponding to the other MAC address may be avoided.

If a MAC address corresponding to slice ID 5 in the slice 5 or slice 9 received by the second edge device 112b does not exist in the stored slice 5' and slice 9', this may be an indication that the equipment corresponding to the MAC address is newly added into the first site 110a. In this case, the processor 210 in the second edge device 112b may store the MAC address in slice 5'. However, if the number of MAC addresses stored in slice 5' has already reached a maximum capacity, e.g., 256, the processor 210 in the second edge device 112b may store the MAC address and the slice ID 5 corresponding to the MAC address in slice 9'.

If a MAC address corresponding to slice ID 5 stored in slice 5' or slice 9' stored in the second edge device 112b (all MAC addresses in slice 5' corresponding to slice ID 5) does not exist in the currently received slice 5 and slice 9, this may be an indication that the equipment corresponding to the MAC address exits the first site 110a, i.e., is no longer in the first site 110a, and the processor 210 of the second edge device 112b may delete the MAC address.

As noted above, by setting a reserved slice that stores MAC addresses corresponding to slices that exceed their maximum capacities, the excess MAC addresses may be stored in the reserved slice and may be sent to remote edge devices 112b-112n. In one regard, the remote edge devices 112b-112n may update the MAC addresses in the corresponding slices stored in the remote edge devices 112b-112n, including in the reserved slices. As such, even in instances in which the number of MAC addresses corresponding to one slice ID exceeds the number of MAC addresses that may be stored in that corresponding slice, the processor 210 in the second edge device 112b may not perform an operation of deleting before adding the MAC address, thus avoiding traffic loss.

Through implementation of either of the methods 300 and 400, the edge device 112a may store a MAC address in the same slice each time the MAC address is learned. In one regard, therefore, when the edge device 112a distributes slices to be updated on remote edge devices 112b-112n, the remote edge devices 112b-112n may update the locally stored MAC addresses corresponding to the MAC addresses contained in the received slices as discussed above with respect to the method 500. As discussed above, the updating of the MAC addresses in this manner may prevent the remote edge devices 112b-112n from performing a MAC address deletion operation prior to adding the same MAC address.

Some or all of the operations set forth in the methods 300, 400, and 500 may be contained as utilities, programs, or subprograms, in any desired computer accessible medium. In addition, the methods 300, 400, and 500 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 6:
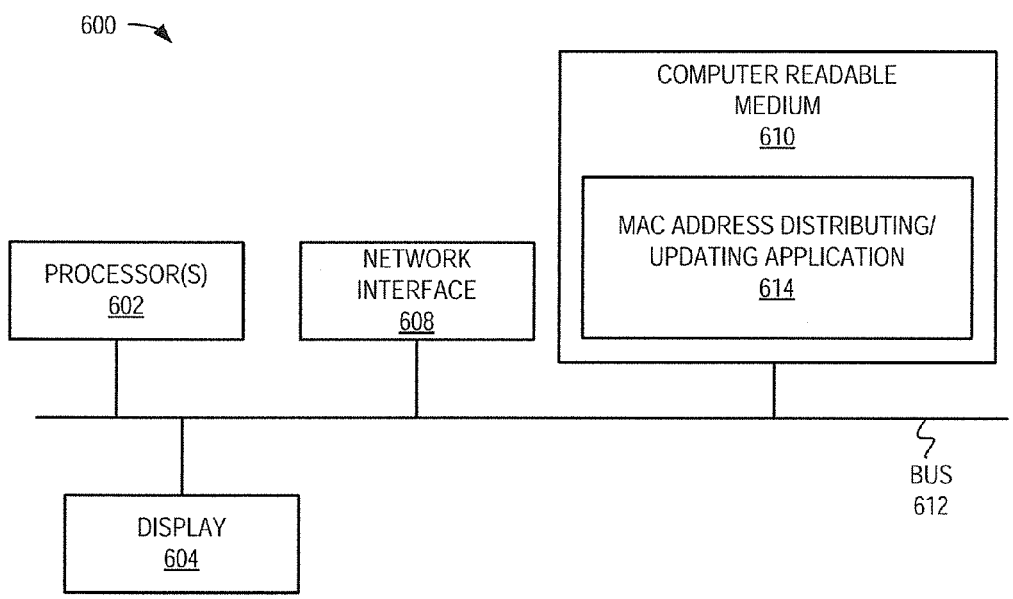
FIG. 6 is schematic representation of a computing device, which may be employed to perform various functions of the edge device depicted in FIG. 2, according to an example of the present disclosure.

Turning now to FIG. 6, there is shown a schematic representation of a computing device 600, which may be employed to perform various functions of the edge device 112a depicted in FIG. 2, according to an example. The device 600 may include a processor 602, a display 604, such as a monitor; a network interface 608, such as a Local Area Network LAN, a wireless 802.11x LAN, a 3G mobile WAN or a WiMax WAN; and a computer-readable medium 610. Each of these components may be operatively coupled to a bus 612. For example, the bus 612 may be an EISA, a PCI, a USB, a FireWire, a NuBus, or a PDS.

The computer readable medium 610 may be any suitable medium that participates in providing instructions to the processor 602 for execution. For example, the computer readable medium 610 may be non-volatile media, such as an optical or a magnetic disk; volatile media, such as memory. The computer-readable medium 610 may also store a MAC address distributing/updating application 614, which may perform the methods 300, 400, and/or 500 and may include the modules 220-230 of the MAC address distribution/updating apparatus 202 depicted in FIG. 2. In this regard, the MAC address distributing/updating application 614 may include a MAC address receiving module 220, an address value determining module 222, a correlation identifying module 224, a storing module 226, a distributing module 228, and an updating module 230.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for media access control (MAC) address distribution by an apparatus, said method comprising:
   receiving a MAC address in the apparatus, wherein the apparatus includes a data store on which is stored a local slice set containing a plurality of slices, wherein each of the plurality of slices is assigned a respective slice identifier (ID);
   determining, by a processor, an address value for the received MAC address;
   identifying, by the processor, a correlation between the determined address value and one of the slice IDs of the plurality of slices; and
   storing, by the processor, the received MAC address in the slice having the slice ID identified as being correlated to the determined address value.

2. The method according to claim 1, wherein the apparatus comprises an edge is device in a wide area network, said method further comprising:
   distributing the slice storing the received MAC address to another apparatus, wherein the another apparatus is to update a locally stored slice corresponding to the slice with the received MAC address.

3. The method according to claim 1, wherein determining the address value of the received MAC address further comprises:
   performing a hash operation on the received MAC address, wherein a result of the hash operation is the address value of the received MAC address.

4. The method according to claim 1, further comprising:
   storing a pre-set mapping relation between the slice IDs and a plurality of hardware address values and the determined slice IDs of the plurality of slices in the data store.

5. The method according to claim 4, wherein each of the slice IDs corresponds to a respective range of the hardware address values and wherein identifying the correlation between the determined address value and one of the slice IDs further comprises identifying a correlation between the determined address value and a hardware address value in a range of hardware address values.

6. The method according to claim 1, wherein each of the slice IDs corresponds to a respective hardware address space value, and wherein determining the address value for the received MAC address further comprises:
   obtaining a predetermined number of hexadecimal digits of the MAC address;
   determining a correlation between the obtained predetermined number of hexadecimal digits of the MAC address and one of the hardware address space values; and
   wherein storing the received MAC address further comprises storing the is received MAC address in the slice corresponding to the correlated hardware address space value.

7. The method according to claim 1, wherein each of the slice IDs corresponds to a respective hardware address space value, and wherein determining the address value for the received MAC address further comprises:
   performing a hash operation on predetermined bits of the MAC address to obtain a corresponding value;
   determining a correlation between the obtained corresponding value and one of the hardware address space values; and
   wherein storing the received MAC address further comprises storing the received MAC address in the slice corresponding to the matching hardware address space value.

8. The method according to claim 1, wherein the data store further stores a reserved slice for storing excess MAC addresses, said method further comprising:
   determining that the slice ID identified as correlating with the determined address value has reached a maximum capacity, wherein storing the received MAC address further comprises storing the received MAC address and the identified slice ID in the reserved slice; and
   distributing the reserved slice to another apparatus.

9. An apparatus for media access control (MAC) address distribution, said apparatus comprising:
   a processor;
   a data store on which is stored a local slice set containing a plurality of slices, wherein each of the plurality of slices is assigned a respective slice identifier (ID); and
   a memory on which is stored machine readable instructions that when executed by the processor cause the processor to:
   receive a MAC address;
   determine an address value for the received MAC address;
   identify a correlation between the determined address value and one of the slice IDs of the plurality of slices stored in the data store;
   store the received MAC address in the slice having the slice ID identified as being correlated to the determined address value; and
   distribute the slice storing the received MAC address to another apparatus, wherein the another apparatus is to update a locally stored slice corresponding to the slice with the received MAC address.

10. The apparatus according to claim 9, wherein, to determine the address value of the received MAC address, the machine readable instructions are further to cause the processor to:
   perform a hash operation on the received MAC address, wherein a result of the hash operation is the address value of the received MAC address.

11. The apparatus according to claim 9, wherein the machine readable instructions are further to cause the processor to:

store a pre-set mapping relation between the slice Ds and a plurality of hardware address values and the determined slice IDs of the plurality of slices in the data store, wherein each of the slice IDs corresponds to a respective range of the hardware address values, and wherein, to identify the correlation between the determined address value and one of the slice IDs, the machine readable instructions are further to identify a correlation between the determined address value and a hardware address value in a range of hardware address values.

12. The apparatus according to claim 9, wherein, to determine the address value for the received MAC address, the machine readable instructions are further to cause the processor to:
obtain a predetermined number of hexadecimal digits of the MAC address;
determine a correlation between the obtained predetermined number of hexadecimal digits of the MAC address and one of the hardware address space values; and
store the received MAC address in the slice corresponding to the correlated hardware address space value.

13. The apparatus according to claim 9, wherein the data store further stores a reserved slice for storing excess MAC addresses, and wherein the machine readable instructions are further to cause the processor to:
determine that the slice ID identified as correlating with the determined address value has reached a maximum capacity; and
store the received MAC address and the identified slice ID in the reserved slice.

14. The apparatus according to claim 9, wherein the apparatus comprises an edge device that is to be implemented in an Ethernet virtual interconnection network.

15. A non-transitory computer readable storage medium on which is stored machine readable instructions that when executed by a processor cause the processor to:
receive a MAC address in the apparatus, wherein the apparatus includes a data store on which is stored a local slice set containing a plurality of slices, wherein each of the plurality of slices is assigned a respective slice identifier (ID);
determine an address value for the received MAC address;
identify a correlation between the determined address value and one of the slice IDs of the plurality of slices; and
store the received MAC address in the slice having the slice ID identified as being correlated to the determined address value.

\* \* \* \* \*

UNITED STATES PATENT AND TRADEMARK OFFICE
CERTIFICATE OF CORRECTION

PATENT NO. : 9,197,598 B2  
APPLICATION NO. : 14/199629  
DATED : November 24, 2015  
INVENTOR(S) : Xiaoheng Song Page 1 of 1

It is certified that error appears in the above-identified patent and that said Letters Patent is hereby corrected as shown below:

In the claims

In column 15, line 43, in Claim 2, delete "edge is" and insert -- edge --, therefor.

In column 16, line 11 approx., in Claim 6, delete "the is" and insert -- the --, therefor.

In column 17, line 1, in Claim 11, delete "Ds" and insert -- IDs --, therefor.

Signed and Sealed this  
Nineteenth Day of April, 2016

Michelle K. Lee  
*Director of the United States Patent and Trademark Office*